(12) United States Patent
Kim

(10) Patent No.: US 9,234,604 B2
(45) Date of Patent: *Jan. 12, 2016

(54) HEAT EXCHANGER FOR VEHICLE

(75) Inventor: Jae Yeon Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 357 days.

This patent is subject to a terminal disclaimer.

(21) Appl. No.: 13/532,514

(22) Filed: Jun. 25, 2012

(65) Prior Publication Data

US 2013/0140017 A1    Jun. 6, 2013

(30) Foreign Application Priority Data

Dec. 6, 2011 (KR) .......................... 10-2011-0129814

(51) Int. Cl.
| | |
|---|---|
| G05D 16/00 | (2006.01) |
| F16K 31/00 | (2006.01) |
| F28F 27/02 | (2006.01) |
| F28D 9/00 | (2006.01) |
| F28D 21/00 | (2006.01) |
| F01M 5/00 | (2006.01) |

(52) U.S. Cl.
CPC .............. *F16K 31/002* (2013.01); *F28D 9/005* (2013.01); *F28D 9/0093* (2013.01); *F28F 27/02* (2013.01); *F01M 5/002* (2013.01); *F28D 2021/0089* (2013.01)

(58) Field of Classification Search
CPC ...... F28F 3/08; F01P 2007/146; F28D 9/0093
USPC ........... 165/297, 140, 166, 167, 300, 103, 41; 123/41.33, 41.31, 41.08, 41.09, 41.1
See application file for complete search history.

(56) References Cited

U.S. PATENT DOCUMENTS

| | | | | | |
|---|---|---|---|---|---|
| 2,670,933 | A | * | 3/1954 | Bay ................................ | 165/297 |
| 3,532,161 | A | * | 10/1970 | Loebel .......................... | 165/167 |
| 5,024,377 | A | * | 6/1991 | Harrison ....................... | 237/2 A |
| 5,180,004 | A | * | 1/1993 | Nguyen ........................ | 165/140 |
| 5,462,113 | A | * | 10/1995 | Wand ............................ | 165/167 |
| 6,164,371 | A | * | 12/2000 | Bertilsson et al. ............ | 165/140 |
| 6,305,466 | B1 | * | 10/2001 | Andersson et al. ........... | 165/140 |

(Continued)

FOREIGN PATENT DOCUMENTS

| | | |
|---|---|---|
| CN | 87206479 U | 1/1988 |
| CN | 1079532 C | 2/2002 |

(Continued)

*Primary Examiner* — Marc Norman
*Assistant Examiner* — Devon Russell
(74) *Attorney, Agent, or Firm* — Morgan, Lewis & Bockius LLP

(57) ABSTRACT

A heat exchanger may include a heat radiating portion provided with first, second, and third connecting lines formed in a predetermined sequence by stacking a plurality of plates, and receiving first, second, and third operating fluids respectively into the first, second, and third connecting lines, the first, second, and third operating fluids exchanging heat with each other while passing through the first, second, and third connecting lines and the first, second, and not being mixed with each other while being circulated, and a bifurcating portion connecting an inflow hole for flowing one operating fluid of the first, second, and third operating fluids with an exhaust hole for exhausting the one operating fluid, adapted for the one operating fluid to bypass the heat radiating portion according to a temperature of the one operating fluid, and mounted at an exterior of the heat radiating portion.

18 Claims, 13 Drawing Sheets

(56) References Cited

U.S. PATENT DOCUMENTS

| | | | |
|---|---|---|---|
| 6,427,640 B1 * | 8/2002 | Hickey et al. | 123/41.31 |
| 6,564,862 B1 * | 5/2003 | Persson | 165/140 |
| 6,772,715 B2 * | 8/2004 | Pfeffinger et al. | 123/41.31 |
| 7,237,513 B2 * | 7/2007 | Pfeffinger et al. | 123/41.29 |
| 7,490,662 B2 * | 2/2009 | Eliades et al. | 165/297 |
| 7,665,513 B2 * | 2/2010 | Sasaki | 165/298 |
| 7,854,256 B2 * | 12/2010 | Pineo et al. | 165/297 |
| 8,342,418 B2 * | 1/2013 | Kanzaka et al. | 236/99 K |
| 8,448,460 B2 * | 5/2013 | Dogariu et al. | 62/179 |
| 8,485,247 B2 * | 7/2013 | Lavric | 165/166 |
| 8,539,983 B2 * | 9/2013 | Kozdras et al. | 137/871 |
| 2003/0217707 A1 * | 11/2003 | Iwasaki | 123/41.31 |
| 2006/0060345 A1 * | 3/2006 | Flik et al. | 165/297 |
| 2006/0060346 A1 * | 3/2006 | Sasaki | 165/297 |
| 2006/0157002 A1 * | 7/2006 | Pfeffinger et al. | 123/41.29 |
| 2007/0125527 A1 * | 6/2007 | Flik et al. | 165/140 |
| 2008/0121381 A1 * | 5/2008 | So et al. | 165/140 |
| 2011/0120396 A1 * | 5/2011 | Myers et al. | 123/41.08 |
| 2011/0127458 A1 | 6/2011 | Kozdras et al. | |

FOREIGN PATENT DOCUMENTS

| | | |
|---|---|---|
| CN | 103134356 A | 6/2013 |
| JP | 2006-162176 A | 6/2006 |
| JP | 2008-170140 A | 7/2008 |
| JP | 2008-274900 A | 11/2008 |
| JP | 2010-196626 A | 9/2010 |
| JP | 2011-069511 A | 4/2011 |
| KR | 10-2011-0056987 A | 5/2011 |

* cited by examiner

HEAT EXCHANGER FOR VEHICLE

CROSS-REFERENCE TO RELATED APPLICATION

The present application claims priority of Korean Patent Application Number 10-2011-0129814 filed Dec. 6, 2011, the entire contents of which application is incorporated herein for all purposes by this reference.

BACKGROUND OF INVENTION

1. Field of Invention

The present invention relates to a heat exchanger for a vehicle. More particularly, the present invention relates to a heat exchanger for a vehicle which can control temperatures of operating fluids which flows in the heat exchanger.

2. Description of Related Art

Generally, a heat exchanger transfers heat from high-temperature fluid to low-temperature fluid through a heat transfer surface, and is used in a heater, a cooler, an evaporator, and a condenser.

Such a heat exchanger reuses heat energy or controls a temperature of an operating fluid flowing therein for demanded performance. The heat exchanger is applied to an air conditioning system or a transmission oil cooler of a vehicle, and is mounted at an engine compartment.

Since the heat exchanger is hard to be mounted at the engine compartment with restricted space, studies for the heat exchanger with smaller size, lighter weight, and higher efficiency have been developed.

A conventional heat exchanger controls the temperatures of the operating fluids according to a condition of a vehicle and supplies the operating fluids to an engine, a transmission, or an air conditioning system. For this purpose, bifurcation circuits and valves are mounted on each hydraulic line through which the operating fluids operated as heating medium or cooling medium passes. Therefore, constituent elements and assembling processes increase and layout is complicated.

If additional bifurcation circuits and valves are not used, heat exchanging efficiency cannot be controlled according to flow amount of the operating fluid. Therefore, the temperature of the operating fluid cannot be controlled efficiently.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a vehicle having advantages of simultaneously warming up and cooling operating fluids according to temperatures of the operating fluids at a running state or an initial starting condition of the vehicle when the operating fluids are heat exchanged with each other in the heat exchanger.

Various aspects of the present invention provide for a heat exchanger for a vehicle having further advantages of improving fuel economy and heating performance by controlling temperatures of operating fluids according to condition of the vehicle, and of reducing assembling processes by simplifying a structure of the heat exchanger.

Various aspects of the present invention provide for a heat exchanger for a vehicle that may include a heat radiating portion provided with first, second, and third connecting lines formed in a predetermined sequence by stacking a plurality of plates, and receiving first, second, and third operating fluids respectively into the first, second, and third connecting lines, the first, second, and third operating fluids exchanging heat with each other during passing through the first, second, and third connecting lines and the first, second, and third operating fluids supplied to the first, second, and third connecting lines not being mixed with each other and being circulated, and a bifurcating portion connecting an inflow hole for flowing one operating fluid of the first, second, and third operating fluids with an exhaust hole for exhausting the one operating fluid, adapted for the one operating fluid to bypass the heat radiating portion according to a temperature of the one operating fluid, and mounted at an exterior of the heat radiating portion.

The first operating fluid may flow into the heat radiating portion through a first inflow hole and may flow out from the heat radiating portion through a first exhaust hole, and the first inflow hole may be connected to the first exhaust hole through the first connecting line.

The second operating fluid may flow into the heat radiating portion through a second inflow hole and may flow out from the heat radiating portion through a second exhaust hole, and the second inflow hole may be connected to the second exhaust hole through the second connecting line.

The third operating fluid may flow into the heat radiating portion through a third inflow hole and may flow out from the heat radiating portion through a third exhaust hole, and the third inflow hole may be connected to the third exhaust hole through the third connecting line.

The first, second, and third inflow holes may be formed at both sides of a surface of the heat radiating portion along a length direction, and the first, second, and third exhaust holes may be disposed apart from the first, second, and third inflow holes and be formed at the both sides of the surface of the heat radiating portion in the length direction.

The first inflow hole and the first exhaust hole may be formed at corner portions of the surface of the heat radiating portion facing diagonally with each other.

The second inflow hole and the second exhaust hole may be formed at corner portions of the surface of the heat radiating portion at which the first inflow hole and the first exhaust hole are not positioned and which face diagonally with each other.

The third inflow hole and the third exhaust hole may be formed at the corner portions of the surface of the heat radiating portion at which the second inflow hole and the second exhaust hole are formed and may be disposed apart from the second inflow hole and the second exhaust hole respectively.

The bifurcating portion may include a connecting pipe connecting the first inflow hole with the first exhaust hole at the exterior of the heat radiating portion and having an inflow port formed at a position close to the first inflow hole and an exhaust port confronting the inflow port and formed at a position close to the first exhaust hole, and a valve unit mounted at one end portion of the connecting pipe close to the first inflow hole, and adapted to extend or contract according to the temperature of the operating fluid such that the operating fluid flowing in through the inflow port flows directly to the exhaust port or flows into the heat radiating portion.

The valve unit may include a mounting cap fixedly mounted to one end of the connecting pipe, and a deformable member having one end portion connected to the mounting cap inserted in the connecting pipe, and adapted to extend or contract according to the temperature of the operating fluid.

The deformable member may be made from shape memory alloy adapted to extend or contract according to the temperature of operating fluid.

The deformable member may be formed by overlapping and contacting a plurality of ring members with each other in a coil spring shape.

The deformable member may include a pair of fixed portions positioned at both sides thereof in a length direction and adapted not to being deformed according to the temperature, and a deformable portion disposed between the pair of fixed portions and adapted to extend or contract according to the temperature of the operating fluid.

The mounting cap may include an inserting portion having one end portion inserted in and fixed to the deformable member, and a mounting portion having one end integrally connected to the other end of the inserting portion, and mounted at an interior circumference of the connecting pipe.

A screw may be formed at an exterior circumference of the mounting portion so as to be threaded to the interior circumference of the connecting pipe.

A blocking portion for being blocked by an end portion of the connecting pipe may be integrally formed with the other end of the mounting portion.

A tool hole may be formed at an interior circumference of the blocking portion.

The heat exchanger may further include a sealing for preventing the operating fluid from leaking from the connecting pipe, and the sealing may be mounted between the mounting portion and the inserting portion.

The heat exchanger may further include an end cap mounted at the other end of the deformable member.

The end cap may be provided with a penetration hole for coping with a pressure changing according to flowing amount of the operating fluid flowing in through the inflow port and flowing the operating fluid in the deformable member so as to improve temperature responsiveness of the deformable member.

The first operating fluid may be a coolant flowing from a radiator, the second operating fluid may be a transmission oil flowing from an automatic transmission, and the third operating fluid may be an engine oil flowing from an engine.

The coolant may circulate through the first inflow hole, the first connecting line, and the first exhaust hole, the transmission oil may circulate through the second inflow hole, the second connecting line, and the second exhaust hole, and the engine oil may circulate through the third inflow hole, the third connecting line, and the third exhaust hole. The second connecting line may be positioned under the first connecting line and the third connecting line may be positioned above the first connecting line.

The coolant may circulate through the first inflow hole, the first connecting line, and the first exhaust hole, the transmission oil may circulate through the second inflow hole, the second connecting line, and the second exhaust hole, and the engine oil may circulate through the third inflow hole, the third connecting line, and the third exhaust hole. The second connecting line or the third connecting line may be disposed between the two neighboring first connecting lines and the second connecting line and the third connecting line may be disposed alternately.

The heat radiating portion may cause the first operating fluid to exchange heat with the second and third operating fluids by counterflow of the first operating fluid and the second and third operating fluids.

The heat radiating portion may be a heat radiating portion of plate type where a plurality of plates is stacked.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
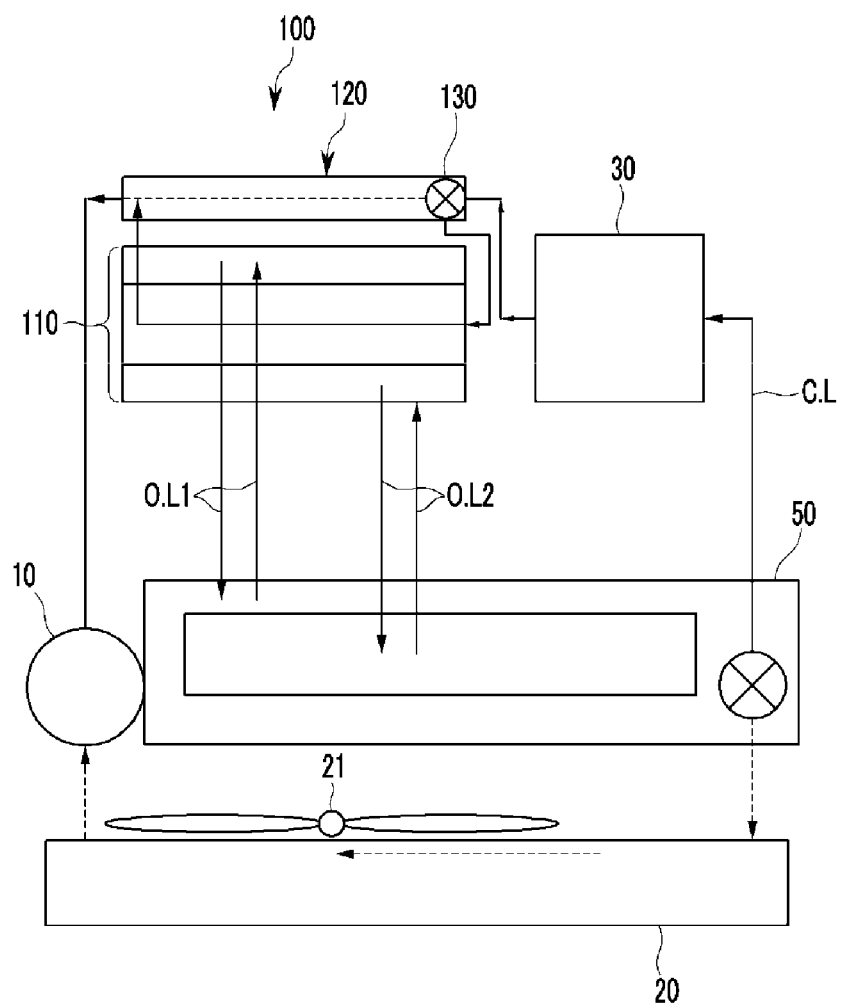
FIG. 1 is a schematic diagram of an exemplary cooling system of an automatic transmission to which a heat exchanger for a vehicle according to the present invention is applied.
Figure 2:
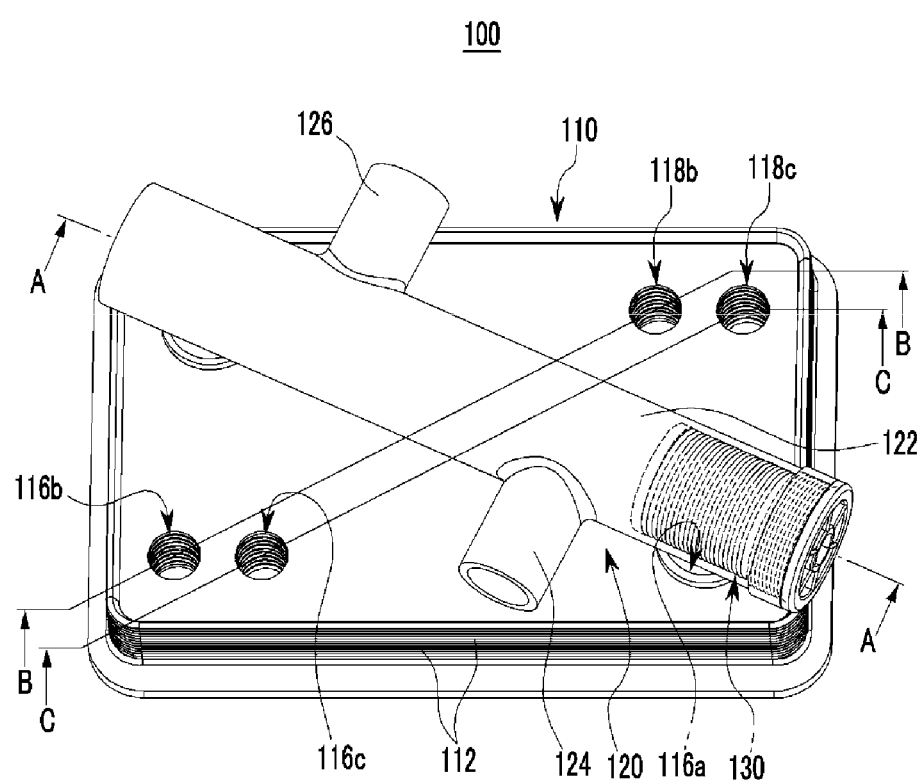
FIG. 2 is a perspective view of an exemplary heat exchanger for a vehicle according to the present invention.
Figure 3:
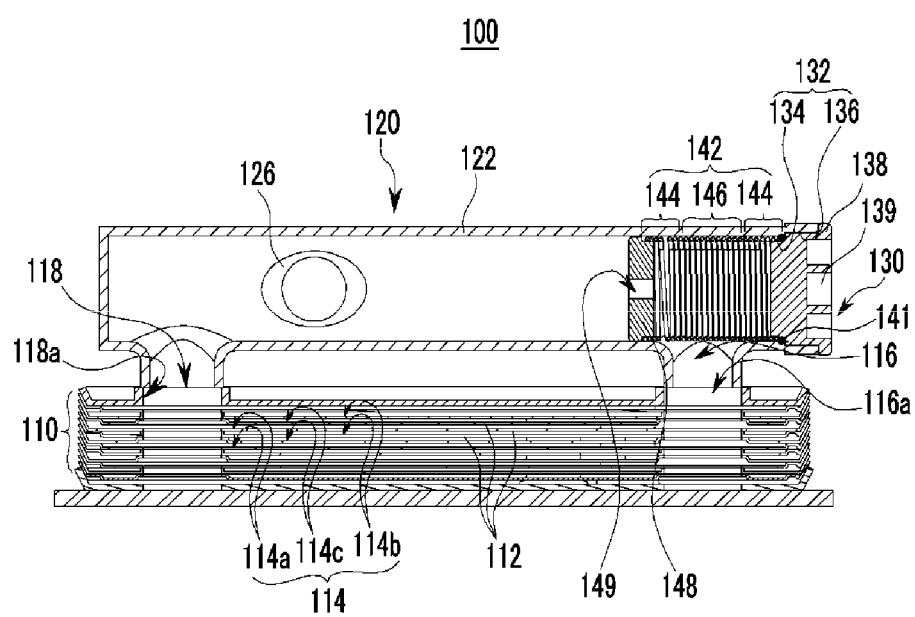
FIG. 3 is a cross-sectional view taken along the line A-A in FIG. 2.
Figure 4:
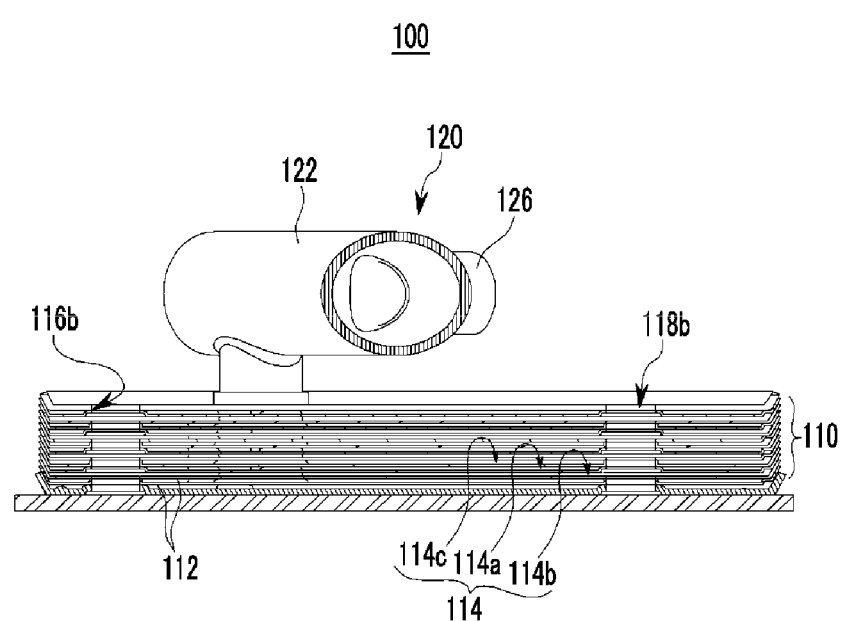
FIG. 4 is a cross-sectional view taken along the line B-B in FIG. 2.
Figure 5:
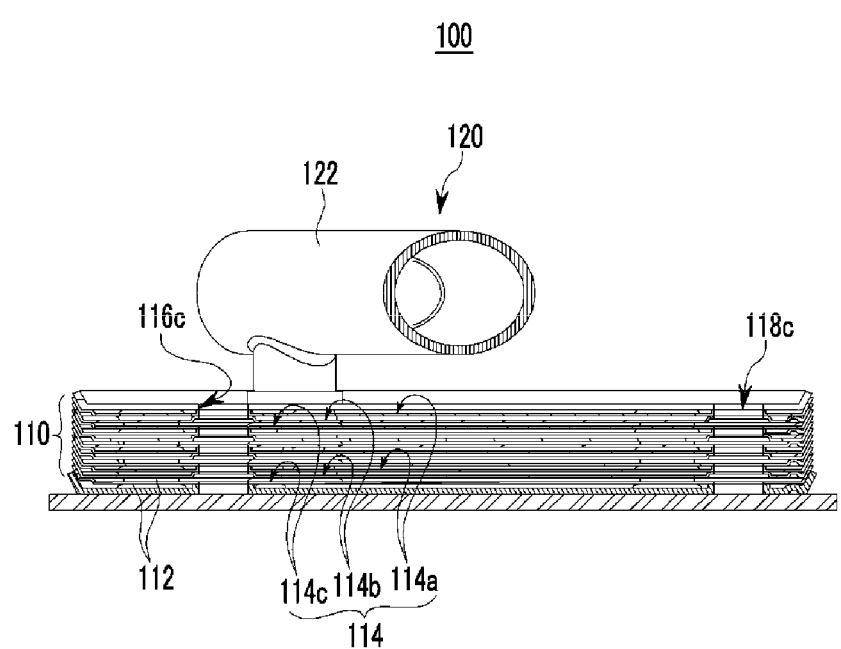
FIG. 5 is a cross-sectional view taken along the line C-C in FIG. 2.
Figure 6:
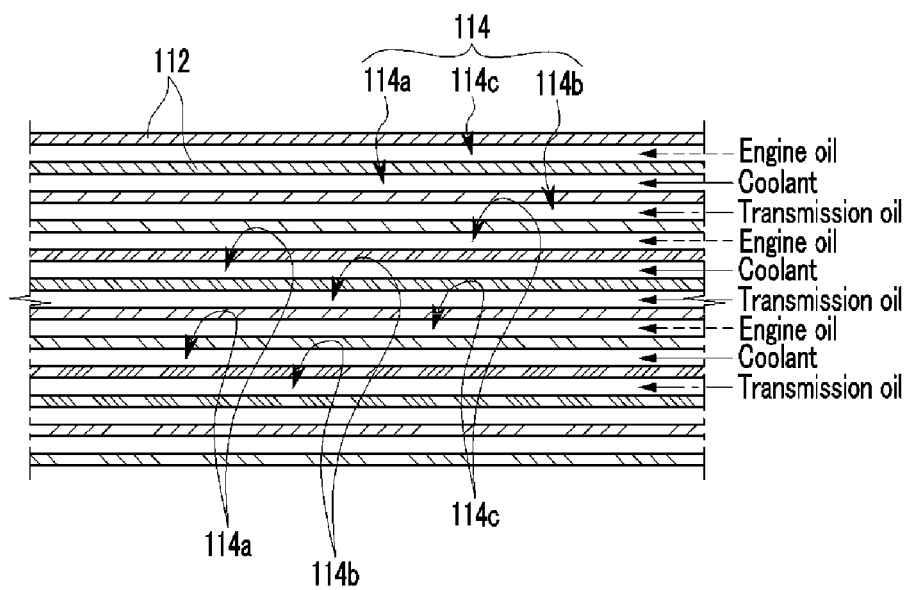
FIG. 6 is a cross-sectional view for showing arrangement of connecting lines in an exemplary heat exchanger for a vehicle according to the present invention.

FIG. 1 is a schematic diagram of a cooling system of an automatic transmission to which a heat exchanger for a vehicle according to various embodiments of the present invention is applied; FIG. 2 is a perspective view of a heat exchanger for a vehicle according to various embodiments of the present invention; FIG. 3 is a cross-sectional view taken along the line A-A in FIG. 2; FIG. 4 is a cross-sectional view taken along the line B-B in FIG. 2; FIG. 5 is a cross-sectional view taken along the line C-C in FIG. 2; and FIG. 6 is a cross-sectional view for showing arrangement of connecting lines in a heat exchanger for a vehicle according to various embodiments of the present invention.

Referring to the drawings, a heat exchanger 100 for a vehicle according to various embodiments of the present invention applies to a cooling system of an automatic transmission for a vehicle.

The cooling system of the automatic transmission, as shown in FIG. 1, is provided with a cooling line C.L for cooling an engine 50. A coolant passes through the radiator 20 having a cooling fan 21 through a water pump 10 and is cooled by the radiator 20. A heater core 30 connected to a heating system of the vehicle is mounted at the cooling line C.L.

A heat exchanger 100 for a vehicle according to various embodiments of the present invention warms up or cools operating fluids according to temperatures of the operating fluids flowing in at a running state or an initial starting condition of the vehicle when the temperatures of the operating fluids are controlled in the heat exchanger 100 through heat exchange.

For this purpose, the heat exchanger 100 for a vehicle according to various embodiments of the present invention is disposed between the water pump 10 and the heater core 30, and is connected to an automatic transmission 40 and the engine 50 through first and second oil lines O.L1 and O.L2.

That is, the operating fluids includes a coolant flowing from the radiator 20, a transmission oil flowing from the automatic transmission 40, and an engine oil flowing from the engine 50 according to various embodiments. The heat exchanger 100 causes transmission oil and the engine oil to exchange heat with the coolant such that temperatures of the transmission oil and the engine oil are controlled.

The heat exchanger 100, as shown in FIG. 2 to FIG. 5, includes a heat radiating portion 110 and a bifurcating portion 120, and the heat radiating portion 110 and the bifurcating portion 120 will be described in detail.

The heat radiating portion 110 is formed by stacking a plurality of plates 112, and a plurality of connecting lines 114 is formed between the neighboring plates 112. In addition, the coolant flows through one of the neighboring three connecting lines 114, the transmission oil flows through another of the neighboring three connecting lines 114, and the engine oil flows through the other of the neighboring three connecting lines 114. At this time, the coolant exchanges heat with the transmission oil and the engine oil.

In addition, the operating fluid supplied to the connecting line 114 is not mixed with other operating fluid supplied to other connecting line 114.

Herein, the heat radiating portion 110 causes the coolant to exchange heat with the transmission oil and the engine oil by counterflow of the coolant and the transmission and engine oils.

The heat radiating portion 110 is a heat radiating portion of plate type (or disk type) where the plurality of plates 112 is stacked.

In addition, the bifurcating portion 120 connects one of inflow holes 116 for flowing the operating fluids into the heat radiating portion 110 with one of exhaust holes 118 for discharging the operating fluids from the heat radiating portion 110, and is mounted at an exterior of the heat radiating portion 110.

The bifurcating portion 120 is configured for the operating fluid to bypass the heat radiating portion 110 according to the temperature of the operating fluid.

The inflow holes 116 includes first, second, and third inflow holes 116a, 116b, and 116c formed at both sides of a surface of the heat radiating portion 110 along a length direction according to various embodiments.

In addition, the exhaust holes 118 includes first, second, and third exhaust holes 118a, 118b, and 118c formed at the both sides of the surface of the heat radiating portion 110 along the length direction. The first, second, and third exhaust holes 118a, 118b, and 118c correspond to the first, second, and third inflow holes 116a, 116b, and 116c and are distanced from the first, second, and third inflow holes 116a, 116b, and 116c. The first, second, and third exhaust holes 118a, 118b, and 118c are connected respectively to the first, second, and third inflow holes 116a, 116b, and 116c through the respective connecting line 114 in the heat radiating portion 110.

The first inflow hole 116a and the first exhaust hole 118a are formed at corner portions of the surface of the heat radiating portion 110 diagonally.

The second inflow hole 116b and the second exhaust hole 118b are formed at corner portions of the surface of the heat radiating portion 110 diagonally, and confront respectively with the first inflow hole 116a and the first exhaust hole 118a.

In addition, the third inflow hole 116c and the third exhaust hole 118c are formed at the corner portions of the surface of the heat radiating portion 110 where the second inflow hole 116b and the second exhaust hole 118b are formed, and are disposed apart from the second inflow hole 116b and the second exhaust hole 118b respectively. The third inflow hole 116c and the third exhaust hole 118c confront respectively with the first inflow hole 116a and the first exhaust hole 118a.

The bifurcating portion 120 includes a connecting pipe 122 and a valve unit 130, and the connecting pipe 122 and the valve unit 130 will be described in detail.

The connecting pipe 122 connects the first inflow hole 116a with the first exhaust hole 116b at the exterior of the heat radiating portion 110, and has an inflow port 124 formed at a position close to the first inflow hole 116a and an exhaust port 126 confronting the inflow port 124 and formed at a position close to the first exhaust hole 118a.

In addition, the valve unit 130 is mounted at an end portion of the connecting pipe 122 corresponding to the first inflow hole 116a, and extends or contracts according to the temperature of the operating fluid.

Accordingly, the valve unit 130 flows the operating fluid flowing therein through the inflow port 124 directly to the exhaust port 124 without passing through the heat radiating portion 110 or passes the operating fluid through the heat radiating portion 110 by flowing the operating fluid into the first inflow hole 116a and then exhausting the operating fluid from the heat radiating portion 110 through the first exhaust hole 118a.

The coolant flowing through the inflow port 124 bypasses the heat radiating portion 110 to the exhaust port 126 through the connecting pipe 122 or circulates through the first inflow hole 116a the heat radiating portion 110 and the first exhaust hole 118a according to selective operation of the valve unit 130.

In addition, the transmission oil circulates through the second inflow hole 116b and the second exhaust hole 118b, and the engine oil circulates through the third inflow hole 116c and the third exhaust hole 118c.

Connecting ports may be mounted respectively at the second and third inflow holes 116b and 116c and the second and third exhaust holes 118b and 118c, and are connected to the automatic transmission 40 and the engine 50 through connecting hoses connected to the connecting ports.

In addition, the inflow port 124 and the exhaust port 126 are connected to the radiator 20 through additional connecting hoses.

In various embodiments, the connecting line 114, as shown in FIG. 6, includes first, second, and third connecting lines 114a, 114b, and 114c, and will be described in detail.

The first connecting line 114a is adapted to flow the coolant flowing into the heat radiating portion 110 through the first inflow hole 114a.

In various embodiments, the second connecting line 114*b* is disposed under the first connecting line 114*a* and the transmission oil flowing in the heat radiating portion 110 through the second inflow hole 116*b* flows through the second connecting lines 114*b*.

In addition, the third connecting line 114*c* is disposed above the first connecting line 114*a* and the engine oil flowing in the heat radiating portion 110 through the third inflow hole 116*c* flows through the third connecting line 114*c*.

Herein, the first connecting line 114*a*, the second connecting line 114*b* disposed under the first connecting line 114*a*, and the third connecting line 114*c* disposed above the first connecting line 114*a* constitute one set of connecting lines. A plurality of sets of connecting lines 114 may be formed in the heat radiating portion 110.

The second connecting line 114*b* through which the transmission oil flows is disposed between the first and third connecting lines 114*a* and 114*c* through which the coolant heated faster and the engine oil flow respectively. Therefore, in a case that a temperature of the transmission oil should be raised at an initial starting of the vehicle or an idle mode, the temperature of the transmission oil may be quickly raised through the second connecting line 114*b* disposed between the first and third connecting lines 114*a* and 114*c*.

Meanwhile, arrangement of connecting lines in a heat exchanger for a vehicle according to various embodiments of the present invention will be described in detail with reference to FIG. 7.

Figure 7:
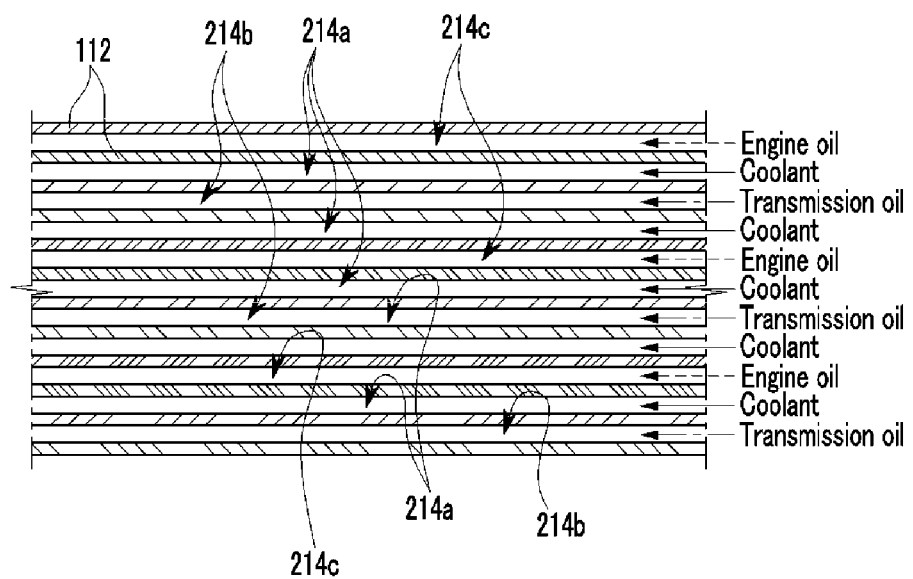
FIG. 7 is a cross-sectional view for showing arrangement of connecting lines in an exemplary heat exchanger for a vehicle according to the present invention.

FIG. 7 is a cross-sectional view for showing arrangement of connecting lines in a heat exchanger for a vehicle according to various embodiments of the present invention.

Referring to the drawing, the first connecting line 214*a* through which the coolant flows is alternately formed with the second and third connecting lines 214*b* and 214*c* through which the transmission oil and the engine oil flow respectively in various embodiments. That is, the second connecting line 214*b* or the third connecting line 214*c* is formed between two neighboring first connecting lines 214*a*, and the second connecting line 214*b* and the third connecting line 214*c* are alternately disposed.

Since the second connecting line 214*b* or the third connecting line 214*c* is formed between two neighboring first connecting lines 214*a* and the second connecting line 214*b* and the third connecting line 214*c* are alternately disposed, the coolant passing through the first connecting line 214*a* exchanges with the transmission oil and the engine oil passing through the second and third connecting lines 214*b* and 214*c*.

Therefore, the heat exchanger 200 for the vehicle according to various embodiments of the present invention may improve cooling performance as a consequence that the coolant flows above and under the transmission oil and the engine oil and exchanges heat with the transmission oil and the engine oil in a case that the transmission oil and the engine oil should be cooled depending on a running state of the vehicle.

Figure 8:
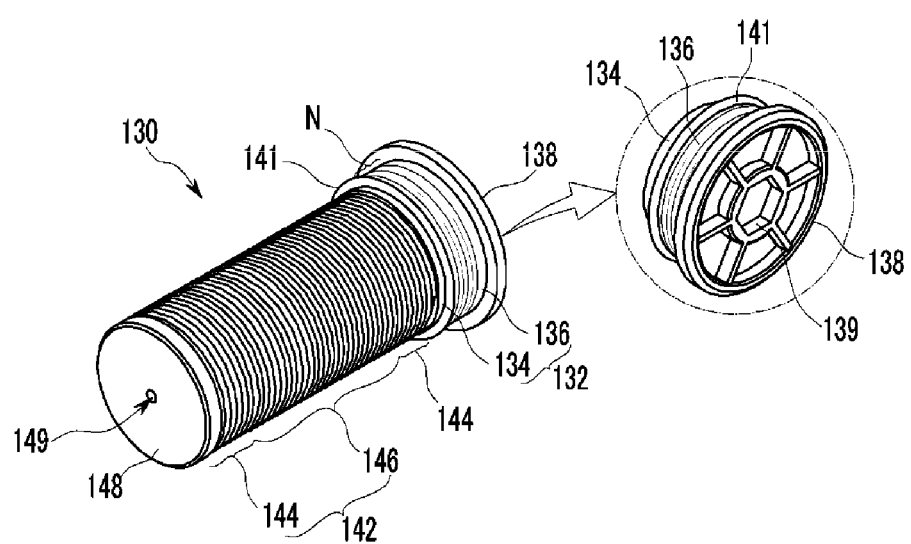
FIG. 8 is a perspective view of a valve unit used in an exemplary heat exchanger for a vehicle according to the present invention.
Figure 9:
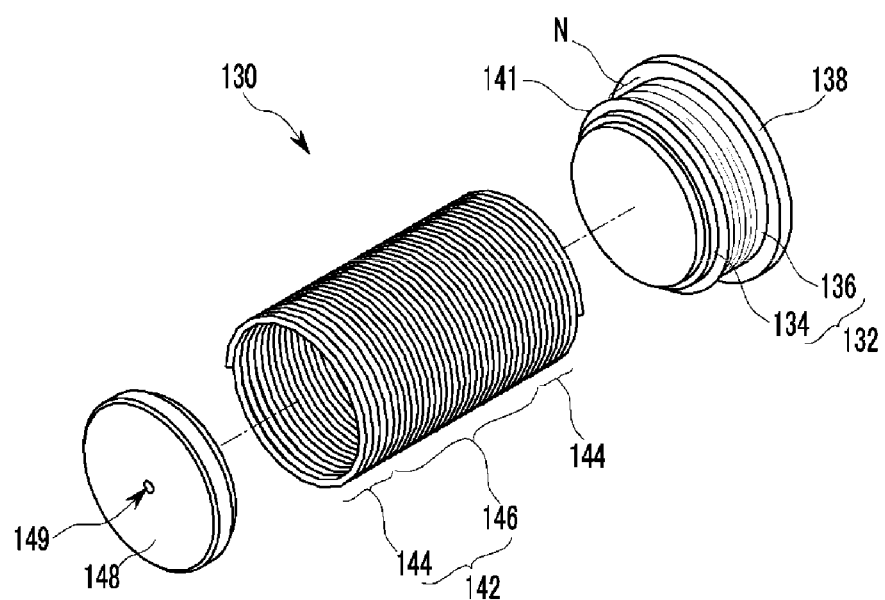
FIG. 9 is an exploded perspective view of an exemplary valve unit according to the present invention.

FIG. 8 and FIG. 9 are a perspective view and an exploded perspective view of a valve unit used in a heat exchanger for a vehicle according to various embodiments of the present invention.

The valve unit 130, as shown in FIG. 8 and FIG. 9, includes a mounting cap 132 and a deformable member 142, and the mounting cap 132 and the deformable member 142 will be described in detail.

The mounting cap 132 is fixedly mounted at an end of the connecting pipe 122 close to the connecting port.

The mounting cap 132 includes an inserting portion 134 having an end portion fitted in the deformable member 142, and a mounting portion 136 integrally connected to the other end of the inserting portion 134 and mounted at an interior circumference of the connecting pipe 122. One will appreciate that the mounting portion and the inserting portion may be monolithically formed.

According to various embodiments, a screw N is formed at an exterior circumference of the mounting portion 136 such that the mounting portion 136 is threaded to an interior circumference of the connecting pipe 122, and tab forming is performed at the interior circumference of the connecting pipe 122 corresponding to the screw N.

In addition, an end of the mounting portion 136 is connected to the inserting portion 134, and a blocking portion 138 is integrally formed at the other end of the mounting portion 136. One will appreciate that the blocking portion and the mounting portion may be monolithically formed. The blocking portion 138 is blocked by the end portion of the connecting pipe 122 such that it is prevented the mounting portion 136 from being inserted further in the connecting pipe 122.

A tool hole 139 in which a tool is inserted is formed at an interior circumference of the blocking portion 138. After the tool is inserted in the tool hole 139, the mounting cap 132 is rotated such that the mounting portion 136 is threaded to the connecting pipe 122.

According to various embodiments, a sealing 141 is mounted between the mounting portion 136 and the inserting portion 134. The sealing 141 prevents the operating fluid flowing into the connecting pipe 122 from being leaked from the connecting pipe 122.

That is, the sealing 141 seals a gap between the interior circumference of the connecting pipe 122 and the exterior circumference of the mounting portion 136 such that the operating fluid is prevented from being leaked along the screw N of the mounting portion 136 threaded to the connecting pipe 122.

The deformable member 142 has an end portion connected to the mounting cap 132 inserted in the connecting pipe 122, and extends or contracts according to the temperature of the operating fluid.

The deformable member 142 can be made from shape memory alloy that can extend or contract according to the temperature of the operating fluid.

The shape memory alloy (SMA) is alloy that remembers a shape at a predetermined temperature. The shape of the shape memory alloy can be changed at a different temperature from the predetermined temperature. If the shape memory alloy, however, is cooled or heated to the predetermined temperature, the shape memory alloy returns to an original shape.

The deformable member 142 made from the shape memory alloy material includes a pair of fixed portions 144 and a deformable portion 146, and the fixed portion 144 and the deformable portion 146 will be described in detail.

The pair of fixed portions 144 is positioned at both end portions of the deformable member 144 in a length direction, and a shape of the fixed portion does not change according to the temperature.

The mounting cap 132 is connected to one fixed portion 144. The mounting cap 132 is fixed to the deformable member 142 by fitting the inserting portion 134 in an interior circumference of the fixed portion 144.

The deformable portion 146 is positioned between the fixed portions 144, and extends or contracts according to the temperature of the operating fluid.

The deformable member 142 has a shape similar to that of a circular coil spring.

According to various embodiments, the other fixed portion 144 is slidably inserted in the connecting pipe 122, and an end cap 148 is mounted at the other fixed portion 144.

At a state where the deformable member 142 of the valve unit 130 extends, the end cap 148 makes the coolant flowing through the inflow port 124 not bypass the heat radiating portion 110. That is, the coolant is discharged to the exhaust port 126 through the first exhaust hole 118a after passing through the first connecting line 114a.

A penetration hole 149 is formed at the end cap 148. The coolant bypasses to the deformable member 142 through the penetration hole 149. The penetration hole 149 copes with a pressure changing according to flowing amount of the operating fluid flowing in through the inflow port 124 and improves temperature responsiveness of the deformable member 142.

That is, the penetration hole 149 prevents the deformable member 142 from being damaged by the pressure of the operating fluid and flows the operating fluid into the deformable member 142 such that the deformable member 142 responds to temperature change of the operating fluid quickly.

Operation of the valve unit 130 will be described in further detail with reference to FIG. 10.

Figure 10:
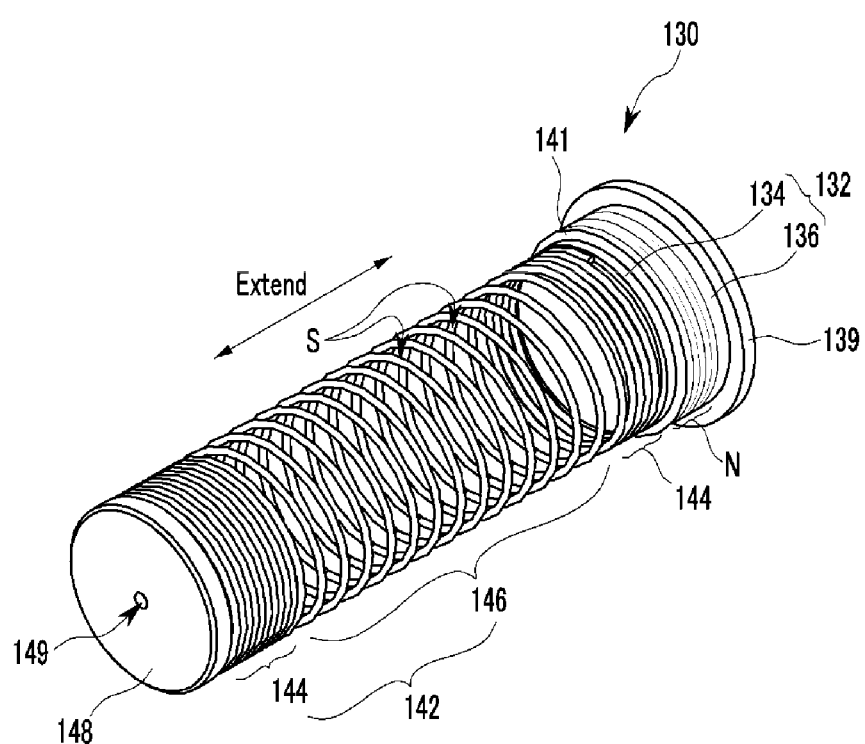
FIG. 10 is a perspective view of an exemplary valve unit at an extended state according to the present invention.

FIG. 10 is a perspective view of a valve unit at an extended state according to various embodiments of the present invention.

Referring to the drawing, if the operating fluid having a higher temperature than the predetermined temperature flows in the valve unit 130, the deformable portion 146 of the deformable member 142 extends.

Accordingly, ring members forming the deformable portion 146 of the deformable member 142 are distanced from each other so as to form a space S, and the operating fluid flows in through the space S.

At this time, ring members forming the fixed portion 144 are fixed to each other by welding, and the fixed portion 144 does not extend.

If the operating fluid having a lower temperature than the predetermined temperature flows into the connecting pipe 122, on the contrary, the deformable portion 146 contracts to an original shape shown in FIG. 8 and the space S is closed.

Operation and function of the heat exchanger 100 according to various embodiments of the present invention will be described in detail.

Figure 11:
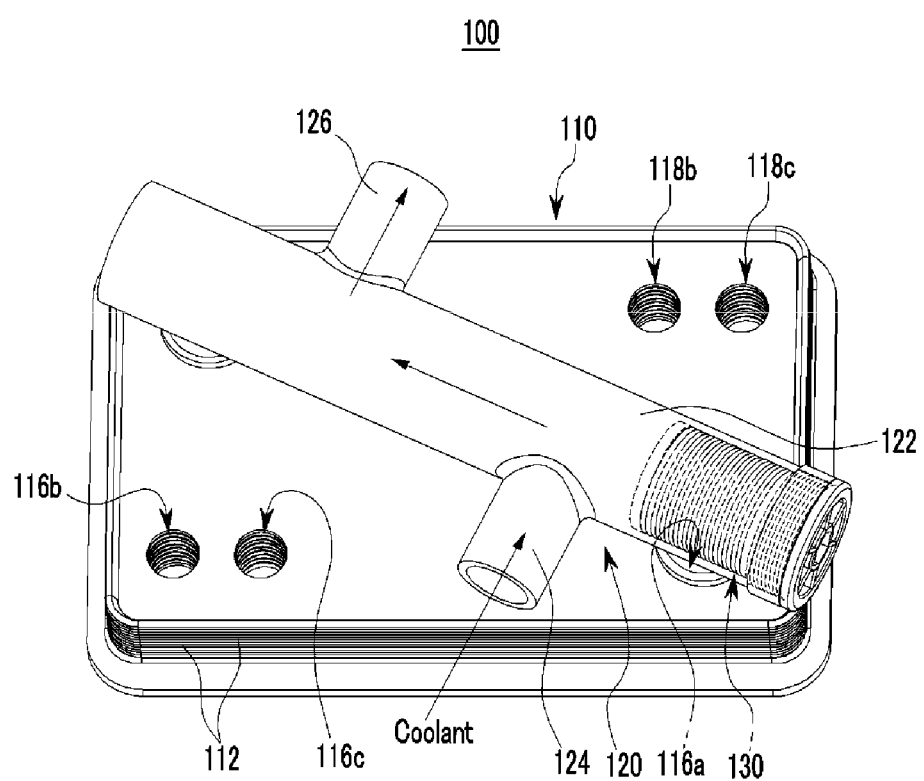
FIG. 11, FIG. 12 and FIG. 13 are perspective and cross-sectional views for describing operation of an exemplary heat exchanger for a vehicle according to the present invention.
Figure 12:
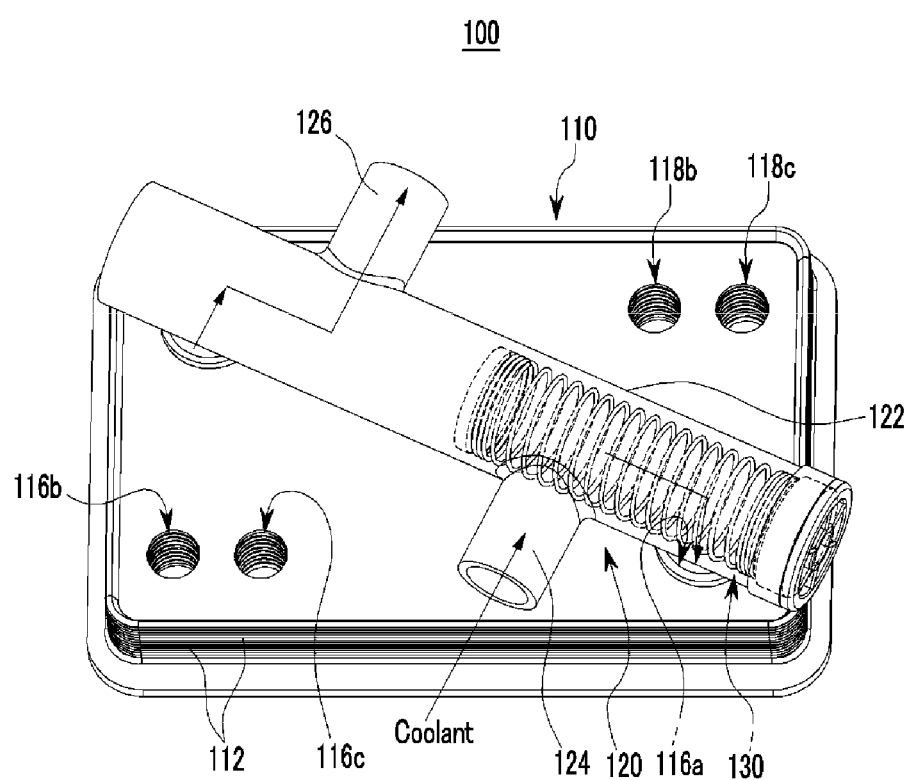
Figure 13:
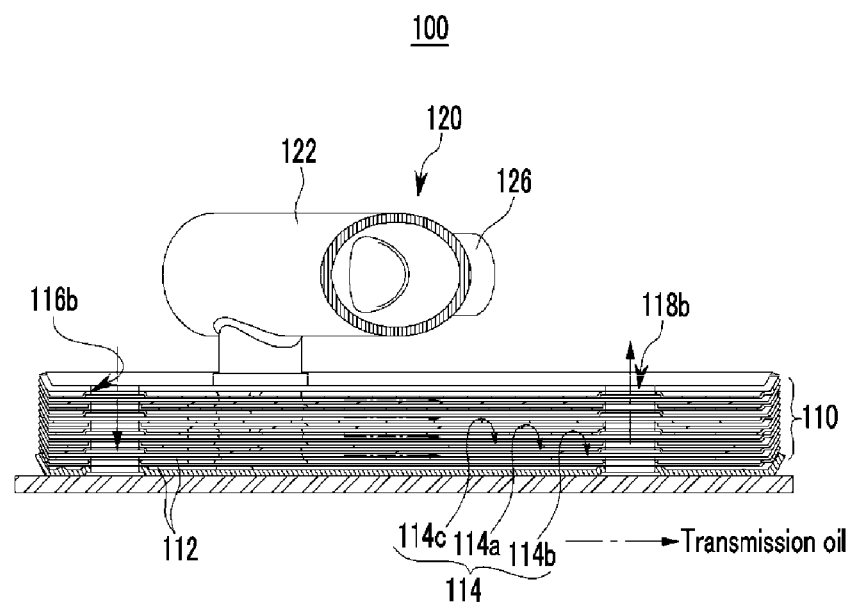
Figure 13:
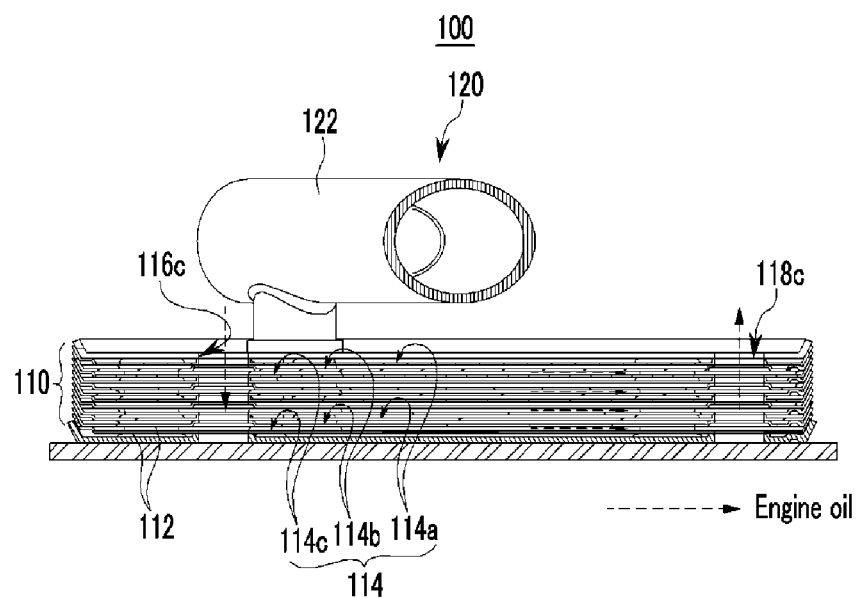

FIG. 11 to FIG. 13 are perspective and cross-sectional views for describing operation of a heat exchanger for a vehicle according to various embodiments of the present invention.

If the temperature of the coolant flowing into the connecting pipe 122 through the inflow port 124 is lower than the predetermined temperature, the deformable member 142 of the valve unit 130 does not deform and maintains an original shape as shown in FIG. 11.

The coolant does not flow into the first connecting line 114a through the first inflow hole 116a of the heat radiating portion 110, but flows to the exhaust port 126 along the connecting pipe 122 and is discharged through the exhaust port 126.

Accordingly, the coolant does not flow into the first connecting line 114a of the heat radiating portion 110.

Then, the transmission oil and the engine oil flows through the second and third inflow holes 116b and 116c and passes through the second and third connecting lines 114b and 114c of the heat radiating portion 110. Since the coolant, however, does not flow into the first connecting line 114a, the coolant does not exchange heat with the transmission oil and the engine oil.

If the transmission oil and the engine oil should be warmed up according to a condition or a mode of the vehicle such as a running state, an idle mode, or an initial starting, the connecting pipe 122 prevents the coolant of low temperature from flowing into the first connecting line 114a. Therefore, it is prevented that the temperatures of the transmission oil and the engine oil are lowered through heat exchange with the coolant.

Since the transmission oil and the engine oil are supplied to the automatic transmission 40 and the engine 50 in a state of being warmed up, heating performance of the vehicle may be improved.

If the temperature of the coolant, on the contrary, is higher than the predetermined temperature, the deformable member 142 of the valve unit 130 extends and the space S is formed between the ring members forming the deformable portion 146 as shown in FIG. 12.

The coolant passing through the inflow port 124 flows into the first inflow hole 116a through the space S and passes through the first connecting line 114a of the heat radiating portion 110. After that, the coolant is discharged to the connecting pipe 122 through the first exhaust hole 118a.

The coolant discharged to the connecting pipe 122 flows to the radiator 20 through the exhaust port 126 of the connecting pipe 122.

Therefore, the coolant passes through the first connecting line 114a of the heat radiating portion 110.

Therefore, the transmission oil and the engine oil supplied from the automatic transmission 40 and the engine 50 through the second inflow hole 116b and the third inflow hole 116c and passing through the second and third connecting lines 114b and 114c exchange heat with the coolant passing through the first connecting line 114a. Therefore, the temperatures of the coolant, the transmission oil, and the engine oil are controlled in the heat radiating portion 110.

Herein, the transmission oil and the engine oil, as shown in FIG. 13, are supplied respectively through the second inflow hole 116b and the third inflow hole 116c.

The transmission oil and the engine oil passes through the second and third connecting lines 114b and 114c formed under and above the first connecting line 114a in the heat radiating portion 110. After that, the transmission oil and the engine oil are exhausted from the heat radiating portion 110 through the second exhaust hole 118b and the third exhaust hole 118c, and are supplied respectively to the automatic transmission 40 and the engine 50.

At this time, the coolant selectively flows to the first connecting line 114a by the valve unit 130 operated according to the temperature of the coolant, and exchanges heat with the transmission oil and the engine oil passing through the second and third connecting lines 114b and 114c.

Herein, the coolant and the transmission oil flow to opposite directions and exchange heat with each other, and the coolant and the engine oil flow to opposite directions and exchange heat with each other.

Therefore, the transmission oil and the engine oil exchange heat with the coolant more efficiently.

Therefore, the transmission oil and the engine oil, the temperatures of which are raised by operation of a torque converter and the engine 50, are cooled through heat exchange with the coolant in the heat radiating portion 110 and are then supplied to the automatic transmission 40 and the engine 50.

That is, since the heat exchanger 100 supplies the cooled transmission oil and the cooled engine oil to the automatic transmission 40 rotating with a high speed and the engine 50, occurrence of slip in the automatic transmission 40 and occurrence of knocking and rancidity in the engine 50 are prevented.

In addition, the engine oil and the transmission oil are heated through heat exchange with the coolant heated faster in the heat radiating portion 110 when the vehicle runs with middle/high speed after being started. After that, the transmission oil and the engine oil are supplied to the automatic transmission 40 and the engine 50. Therefore, friction loss in the automatic transmission 40 and the engine 50 may be lowered and fuel economy may be improved.

The end cap 148 prevents the coolant flowing in through the inflow port 124 at an extended state of the deformable member 142 from being exhausted directly to the exhaust port 126 and exhausts very small amount of the coolant through the penetration hole 149. Therefore, it is prevented that the deformable member 142 is damaged by the pressure of the coolant.

If the heat exchanger 100 according to various embodiments of the present invention is applied, the operating fluids can be warmed up and cooled simultaneously by using the temperatures of the operating fluids at the running state or the initial starting condition of the vehicle. Therefore, the temperatures of the operating fluids can be controlled efficiently.

In addition, since the deformable member 142 is made from the shape memory alloy, structure of the valve unit 130 is very simple. Since the valve unit 130 performs conversion of the hydraulic lines of the operating fluid according to the temperature of the operating fluid, flow of the operating fluid can be controlled accurately. Therefore, constituent elements can be simplified and production cost may be curtailed. In addition, weight may be reduced.

In addition, responsiveness of the valve according to the temperature of the operating fluid may be improved.

Since the temperatures of the operating fluids can be controlled according to the condition of the vehicle, fuel economy and heating performance may be improved.

Since two operating fluids exchange heat with the coolant through one heat exchanger, structure and package may be simplified and assembling processes may be reduced.

Since additional bifurcation circuits are not needed, production cost may be curtailed, workability and utilization of space in a small engine compartment may be improved, and a layout of connecting hoses may be simplified.

If the operating fluid is the transmission oil in the automatic transmission 40, hydraulic friction at a cold starting may be lowered due to fast warm up. In addition, slip may be prevented and durability may be maintained at driving due to excellent cooling performance. Therefore, fuel economy and durability of the transmission may be improved.

Since the transmission oil and the engine oil are warmed up and cooled down by using the coolant, heat exchange efficiency, cooling performance, and heating performance may be improved compared with an air-cooled type heat exchanger.

It is exemplified in this specification that the coolant, the transmission oil, and the engine oil are used as the operating fluids, but the operating fluids are not limited to these. All the operating fluids that require warming up or cooling can be used.

In addition, the heat exchanger according to various embodiments may further include covers and brackets that prevent damage of the heat exchanger and other components or that are used for fixing the heat exchanger to other components or the engine compartment.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A heat exchanger for a vehicle, comprising:
a heat exchanging portion provided with a first connecting line, a second connecting line, and a third connecting line formed in a predetermined sequence by stacking a plurality of plates, wherein the heat exchanging portion is configured for receiving a first operating fluid into the first connecting line, a second operating fluid into the second connecting line, and a third operating fluid into the third connecting line, the first, second, and third operating fluids exchanging heat with each other while the first, second, and third operating fluids are circulated without being mixed with each other; and
a bifurcating portion connecting a first inflow hole for flowing one operating fluid of the first, second, and third operating fluids with a first exhaust hole for exhausting the one operating fluid, wherein the bifurcating portion is adapted for the one operating fluid to bypass the heat exchanging portion according to a temperature of the one operating fluid, and wherein the bifurcating portion is mounted at an exterior of the heat exchanging portion,
wherein the first operating fluid flows into the heat exchanging portion through the first inflow hole and flows out from the heat exchanging portion through the first exhaust hole, and the first inflow hole is connected to the first exhaust hole through the first connecting line;
wherein the second operating fluid flows into the heat exchanging portion through a second inflow hole and flows out from the heat exchanging portion through a second exhaust hole, and the second inflow hole is connected to the second exhaust hole through the second connecting line;
wherein the third operating fluid flows into the heat exchanging portion through a third inflow hole and flows out from the heat exchanging portion through a third exhaust hole, and the third inflow hole is connected to the third exhaust hole through the third connecting line;
wherein the first, second, and third inflow holes are placed along a first lateral side of a surface of the heat exchanging portion in a longitudinal direction of the heat exchanging portion,
wherein the first, second, and third exhaust holes are disposed apart from the first, second, and third inflow holes and are placed along a second lateral side of the surface of the heat exchanging portion in the longitudinal direction of the heat exchanging portion,
wherein the bifurcating portion comprises:
a connecting pipe connecting the first inflow hole with the first exhaust hole at the exterior of the heat exchanging portion and having an inflow port formed at a position close to the first inflow hole and an exhaust port oriented in an opposing direction to the inflow port and formed at a position close to the first exhaust hole; and a valve unit mounted at one end portion of the connecting pipe close to the first inflow hole, and adapted to extend or contract according to the temperature of the operating fluid such that the operating fluid flowing in through the inflow port flows directly to the exhaust port or flows into the heat exchanging portion, wherein the valve unit comprises:

a mounting cap fixedly mounted to one end of the connecting pipe; and a deformable member inserted in the connecting pipe and having one end portion connected to the mounting cap, and adapted to extend or contract according to the temperature of the operating fluid, wherein the deformable member is formed by overlapping and contacting a plurality of ring members with each other in a coil spring shape, and wherein the operating fluid flowing into the inflow port bypasses to the exhaust port when bodies of the neighboring ring members closely contact with each other to block a flow passage between the inflow port and the heat exchanging portion port by the bodies thereof, or flows to the heat exchanging portion through a gap of the neighboring ring members when bodies of the neighboring ring members are spaced from each other, according to the heat of the operating fluid.

2. The heat exchanger of claim 1, wherein the first inflow hole and the first exhaust hole are formed at first two corner portions of the surface of the heat exchanging portion, wherein the first two corner portions are aligned in a first diagonal direction of the surface of the heat exchanging portion.

3. The heat exchanger of claim 1, wherein the second inflow hole and the second exhaust hole are placed at second two corner portions of the surface of the heat exchanging portion at which the first inflow hole and the first exhaust hole are not positioned, wherein the second two corner portions are aligned in a second diagonal direction of the surface of the heat exchanging portion.

4. The heat exchanger of claim 1, wherein the third inflow hole and the third exhaust hole are formed at the corner portions of the surface of the heat exchanging portion at which the second inflow hole and the second exhaust hole are formed and are disposed apart from the second inflow hole and the second exhaust hole respectively.

5. The heat exchanger of claim 1, wherein the deformable member is made from shape memory alloy adapted to extend or contract according to the temperature of operating fluid.

6. The heat exchanger of claim 1, wherein the deformable member comprises:

a pair of fixed portions positioned at both sides thereof in a length direction and adapted not to being deformed according to the temperature; and a deformable portion disposed between the pair of fixed portions and adapted to extend or contract according to the temperature of the operating fluid.

7. The heat exchanger of claim 1, wherein the mounting cap comprises:

an inserting portion having one end portion inserted in and fixed to the deformable member; and a mounting portion having one end integrally connected to the other end of the inserting portion, and mounted at an interior circumference of the connecting pipe.

8. The heat exchanger of claim 7, wherein a screw is formed at an exterior circumference of the mounting portion so as to be threaded to the interior circumference of the connecting pipe.

9. The heat exchanger of claim 7, wherein a blocking portion for being blocked by an end portion of the connecting pipe is integrally formed with the other end of the mounting portion.

10. The heat exchanger of claim 9, wherein a tool hole is formed at an interior circumference of the blocking portion.

11. The heat exchanger of claim 7, further comprising a seal for preventing the operating fluid from leaking from the connecting pipe;

wherein the seal is mounted between the mounting portion and the inserting portion.

12. The heat exchanger of claim 1, further comprising an end cap mounted at the other end of the deformable member.

13. The heat exchanger of claim 12, wherein the end cap is provided with a penetration hole for coping with a pressure change according to flowing amount of the operating fluid flowing in through the inflow port and flowing the operating fluid in the deformable member so as to improve temperature responsiveness of the deformable member.

14. The heat exchanger of claim 1, wherein the first operating fluid is a coolant flowing from a radiator, the second operating fluid is a transmission oil flowing from an automatic transmission, and the third operating fluid is an engine oil flowing from an engine.

15. The heat exchanger of claim 14, wherein the coolant circulates through the first inflow hole, the first connecting line, and the first exhaust hole, the transmission oil circulates through the second inflow hole, the second connecting line, and the second exhaust hole, and the engine oil circulates through the third inflow hole, the third connecting line, and the third exhaust hole; and wherein the second connecting line is positioned under the first connecting line and the third connecting line is positioned above the first connecting line.

16. The heat exchanger of claim 14, wherein the coolant circulates through the first inflow hole, the first connecting line, and the first exhaust hole, the transmission oil circulates through the second inflow hole, the second connecting line, and the second exhaust hole, and the engine oil circulates through the third inflow hole, the third connecting line, and the third exhaust hole; and wherein the second connecting line or the third connecting line is disposed between the two neighboring first connecting lines and the second connecting line and the third connecting line are disposed alternately.

17. The heat exchanger of claim 1, wherein the heat exchanging portion causes the first operating fluid to exchange heat with the second and third operating fluids by counterflow of the first operating fluid and the second and third operating fluids.

18. The heat exchanger of claim 1, wherein the heat exchanging portion is a heat radiating portion of plate type where a plurality of plates is stacked.

* * * * *